(12) United States Patent
dos Santos e Lucato

(10) Patent No.: US 8,424,203 B2
(45) Date of Patent: Apr. 23, 2013

(54) HEAT PIPE APPARATUS AND METHOD

(75) Inventor: Sergio L. dos Santos e Lucato, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 1305 days.

(21) Appl. No.: 11/763,996

(22) Filed: Jun. 15, 2007

(65) Prior Publication Data

US 2008/0307649 A1    Dec. 18, 2008

(51) Int. Cl.
*H05K 7/20* (2006.01)

(52) U.S. Cl.
USPC .............. 29/890.03; 29/890.039; 29/890.051

(58) Field of Classification Search .............. 29/890.03, 29/890.039, 890.04, 890.051, 890.052, 890.09; 165/907
See application file for complete search history.

(56) References Cited

U.S. PATENT DOCUMENTS

| | | | |
|---|---|---|---|
| 4,270,602 A * | 6/1981 | Foster .......................... | 165/167 |
| 4,966,229 A | 10/1990 | Senterfitt | |
| 6,033,506 A * | 3/2000 | Klett ................................ | 156/78 |
| 6,888,720 B2 * | 5/2005 | Pfister et al. .................. | 361/689 |
| 7,850,061 B2 * | 12/2010 | Rigal et al. ..................... | 228/193 |
| 2005/0178534 A1 * | 8/2005 | Kienbock et al. ............. | 165/148 |
| 2010/0218921 A1 * | 9/2010 | Sabatino et al. .............. | 165/133 |

FOREIGN PATENT DOCUMENTS

WO    WO 2006067349 A1 *    6/2006

* cited by examiner

*Primary Examiner* — Jermie Cozart
*Assistant Examiner* — Christopher Besler
(74) *Attorney, Agent, or Firm* — Klintworth & Rozenblat IP LLC

(57) ABSTRACT

In one embodiment, a thermal protection device for dissipating heat includes a shell having an outer shell surface and an inner shell surface defining a hollow inner shell chamber. A plurality of porous wick structures are disposed against each other within the hollow inner shell chamber. Each porous wick structure comprises an outer wick surface which is disposed at least one of against and near the inner shell surface and a porous inner wick surface defining a hollow inner wick chamber. A plurality of porous wick lid members are provided. The porous wick lid members are disposed between the porous wick structures within the hollow inner shell chamber of the shell. A cooling substance is disposed within the plurality of porous wick structures.

19 Claims, 9 Drawing Sheets

HEAT PIPE APPARATUS AND METHOD

BACKGROUND

Many vehicles such as aircraft, and other structures and devices, may have areas which must be of reduced size and of tight geometrical tolerances, and yet must sustain high heat loads and high pressure loads. For instance, the leading edges of a hypersonic vehicle may have these requirements. One of the existing solutions for high heat loads may be to use a thermal protection device which may be made of refractory alloys. However, these materials may be very heavy. Another existing solution may be to use a thermal protection device which may be made of ablating materials. However, these materials may force a change in the geometry of the structure. Yet another existing solution may be to use a thermal protection device which bleeds coolant into the environment. However, this may lead to air flow which is contaminated, and may limit the flight times. Still another existing solution may be to use a thermal protection device which comprises a conventional heat pipe. However, this may produce a tip radius which may be too large and/or may be non-load bearing.

A thermal protection device, and method of use and/or manufacturing, is needed to decrease one or more problems associated with one or more of the existing devices and/or methods.

SUMMARY

In one aspect of the disclosure, a thermal protection device includes a shell having an outer shell surface and an inner shell surface defining a hollow inner shell chamber. A plurality of porous wick structures are disposed against each other within the hollow inner shell chamber. Each porous wick structure comprises an outer wick surface which is disposed at least one of against and near the inner shell surface and a porous inner wick surface defining a hollow inner wick chamber. A plurality of porous wick lid members are provided. The porous wick lid members are disposed between the porous wick structures within the hollow inner shell chamber of the shell. A cooling substance is disposed within the plurality of porous wick structures.

In another aspect of the disclosure, a method of dissipating heat is disclosed. In one step, a closed thermal protection device is provided. The thermal protection device includes a shell having an outer shell surface and an inner shell surface defining a hollow inner shell chamber. A plurality of porous wick structures are disposed against each other within the hollow inner shell chamber. Each porous wick structure comprises an outer wick surface which is disposed at least one of against and near the inner shell surface and a porous inner wick surface defining a hollow inner wick chamber. A plurality of porous wick lid members are provided. The porous wick lid members are disposed between the porous wick structures within the hollow inner shell chamber of the shell. A cooling substance is disposed within the plurality of porous wick structures. In another step, heat is generated against a portion of the outer shell surface. In an additional step, the heat is transported through the shell, through the plurality of porous wick structures, and into the cooling substance. In yet another step, some of the cooling substance is evaporated into a gas. In another step, the gas is flowed through the porous wick structures and into the hollow inner wick chambers. In still another step, the gas is condensed within the hollow inner wick chambers into a fluid due to a portion of the outer shell surface being disposed at least one of against and near a cooling structure. In yet another step, the condensed fluid is flowed into the porous wick structures.

In a further aspect of the disclosure, a method is disclosed of manufacturing a thermal protection device for dissipating heat. In one step, a shell is formed comprising an outer shell surface and an inner shell surface defining a hollow inner shell chamber. In an additional step, a first porous wick structure is inserted within the hollow inner shell chamber. The first porous wick structure comprises a first outer wick surface and a first porous inner wick surface defining a first hollow inner wick chamber. In yet another step, a first side of a porous wick lid member is disposed against the first porous wick structure within the hollow inner shell chamber of the shell in order to substantially cover one side of the first hollow inner wick chamber. In an additional step, a second porous wick structure is inserted against a second side of the porous wick lid member within the hollow inner shell chamber of the shell. The second porous wick structure comprises a second outer wick surface and a second porous inner wick surface defining a second hollow inner wick chamber. In yet another step, the first porous wick structure, the porous wick lid member, and the second porous wick structure are fixedly attached to each other within the hollow inner shell chamber of the shell.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
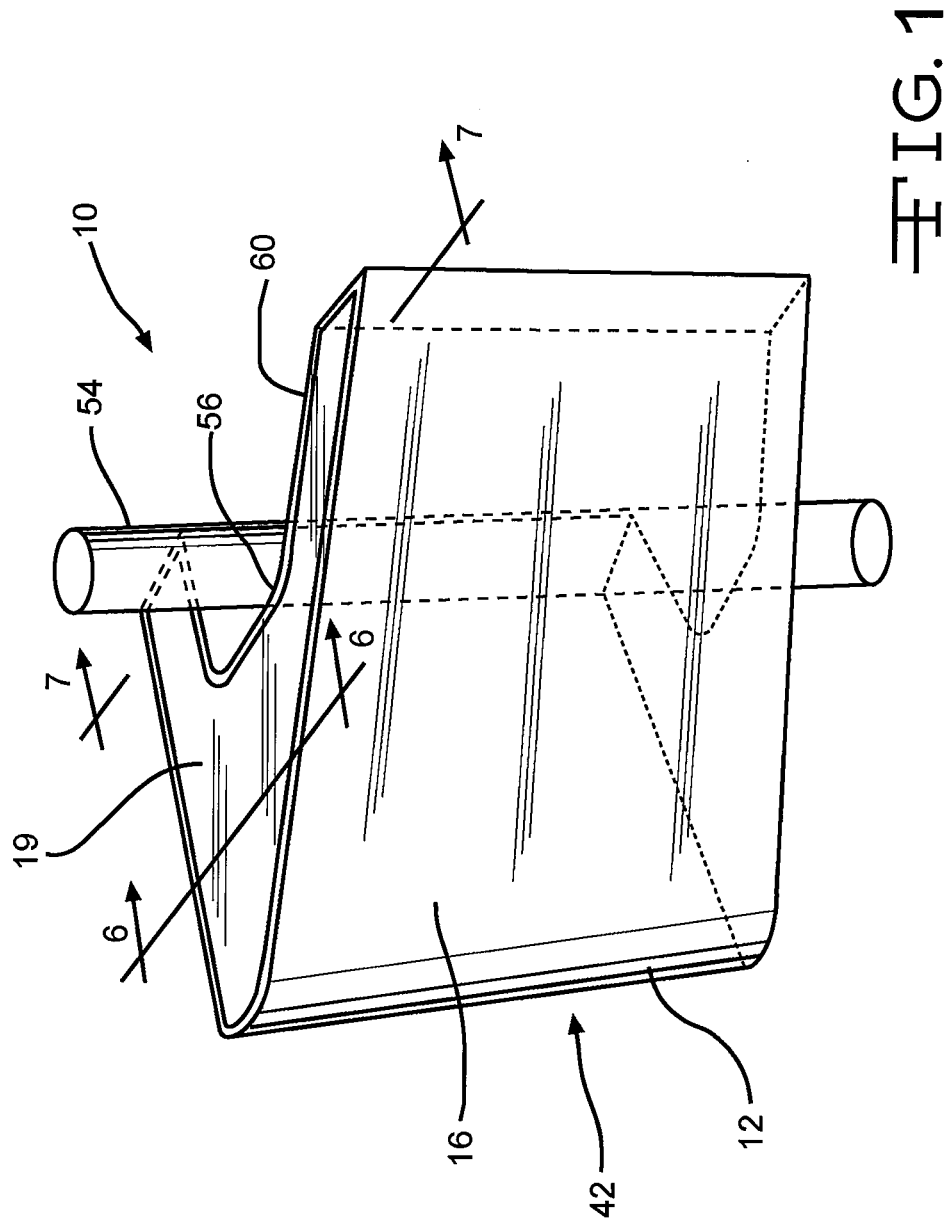
FIG. 1 shows a top-side perspective view of one embodiment of a thermal protection device for dissipating heat.
Figure 2:
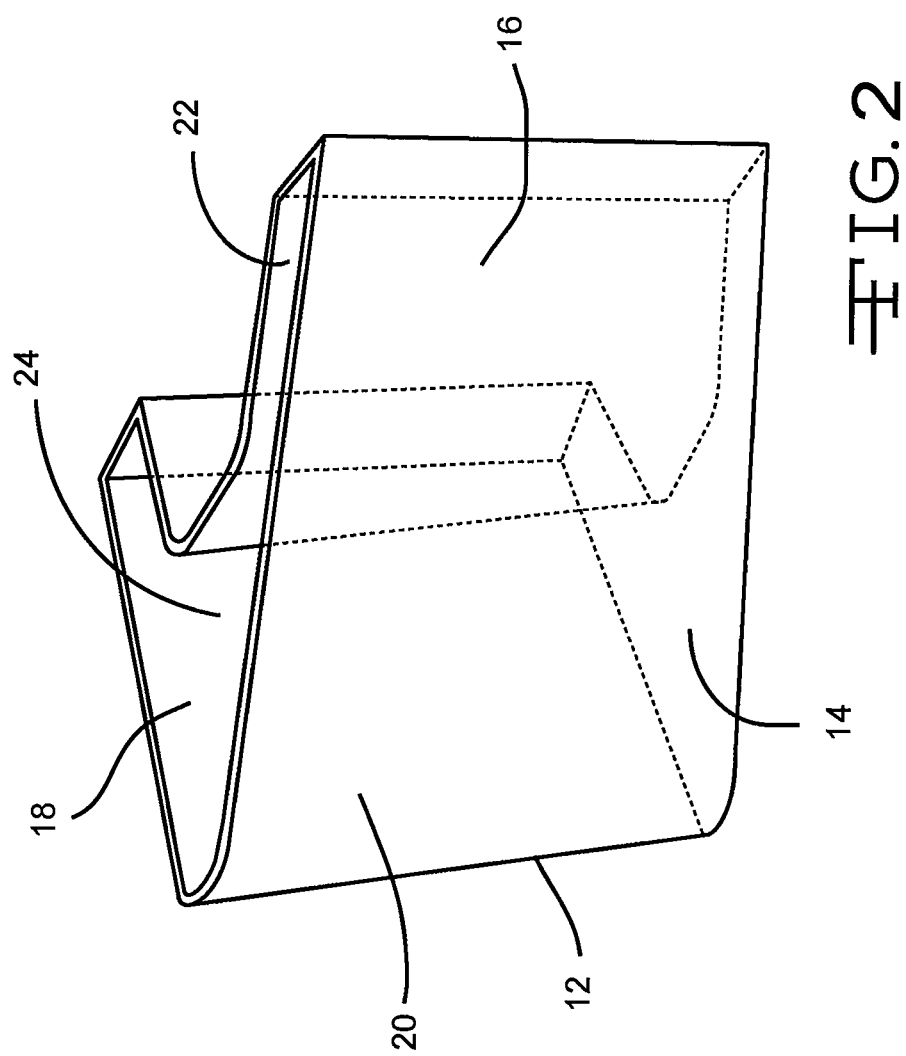
FIG. 2 shows a top-side perspective view of the shell of FIG. 1 with the shell's surfaces shown as being transparent, and the plate member and the inner components removed in order to fully view the shell.

FIG. 1 shows a top-side perspective view of one embodiment of a thermal protection device 10 for dissipating heat. The thermal protection device 10 may be used to dissipate heat from a leading edge of an aircraft vehicle. In other embodiments, the thermal protection device 10 may be used to dissipate heat from other types of vehicles, devices, or structures. The thermal protection device 10 may include a shell 12. FIG. 2 shows a top-side perspective view of the shell 12 of FIG. 1 with the shell's surfaces shown as being transparent, the plate member 19 covering the shell 12 removed, and the inner components removed from the shell 12 in order to fully view the shell 12.

As shown in FIGS. 1 and 2, the shell 12 has a bottom surface 14 and side surfaces 16 extending around the periphery of the bottom surface 14. The top portion 18 of the shell 12 may be hollow and covered with a plate member 19 which may be attached to the side surface 16 through welding or other attachment mechanisms, in order to provide a closed thermal protection device 10. The bottom surface 14 and side surfaces 16 of the shell 12 may include an outer shell surface 20 and an inner shell surface 22 defining a hollow inner shell chamber 24. The shell 12 may be welded, bended, or formed in another manner. The shell 12 may be made of a material that can withstand high temperatures such as a super alloy, a carbon silicon carbide composite, certain composites, certain types of metal, certain thin materials, and/or other type of material.

Figure 3:
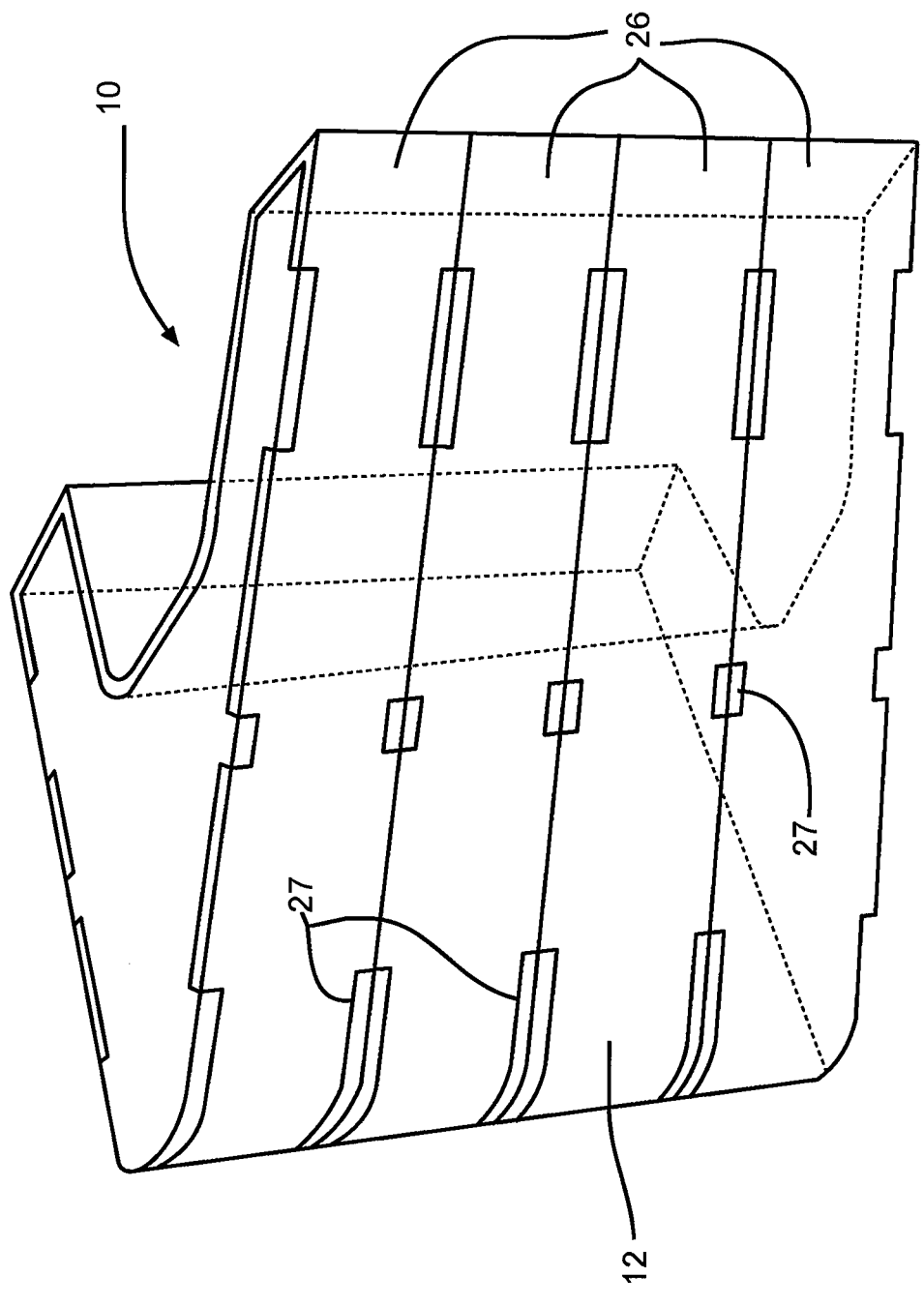
FIG. 3 shows a top-side perspective view of the thermal protection device of FIG. 1, with the shell's surfaces shown as being transparent in order to show the inner components disposed within the shell.

FIG. 3 shows a top-side perspective view of the thermal protection device 10 of FIG. 1, with the surfaces of the shell 12 shown as being transparent in order to show a stacked plurality of porous wick structures 26 and plurality of porous wick lid members 27 disposed against each other within the hollow inner shell chamber 24 of the shell 12. Each of the porous wick structures 26 and porous wick lid members 27 may be molded and/or made of a metal foam or other type of porous material. As shown in FIG. 3, one or more porous wick lid members 27 may be stacked between every two porous wick structures 26 within the inner shell chamber 24. The alternating porous wick structures 26 and lid members 27 may be welded together, interlocked together using male and female tabs, and/or attached to one another using varying attachment mechanisms. In other embodiments, additional porous wick lid members 27 may be stacked against the bottom surface 14 of the shell 12 and the plate member 19 covering the shell 12.

Figure 4:
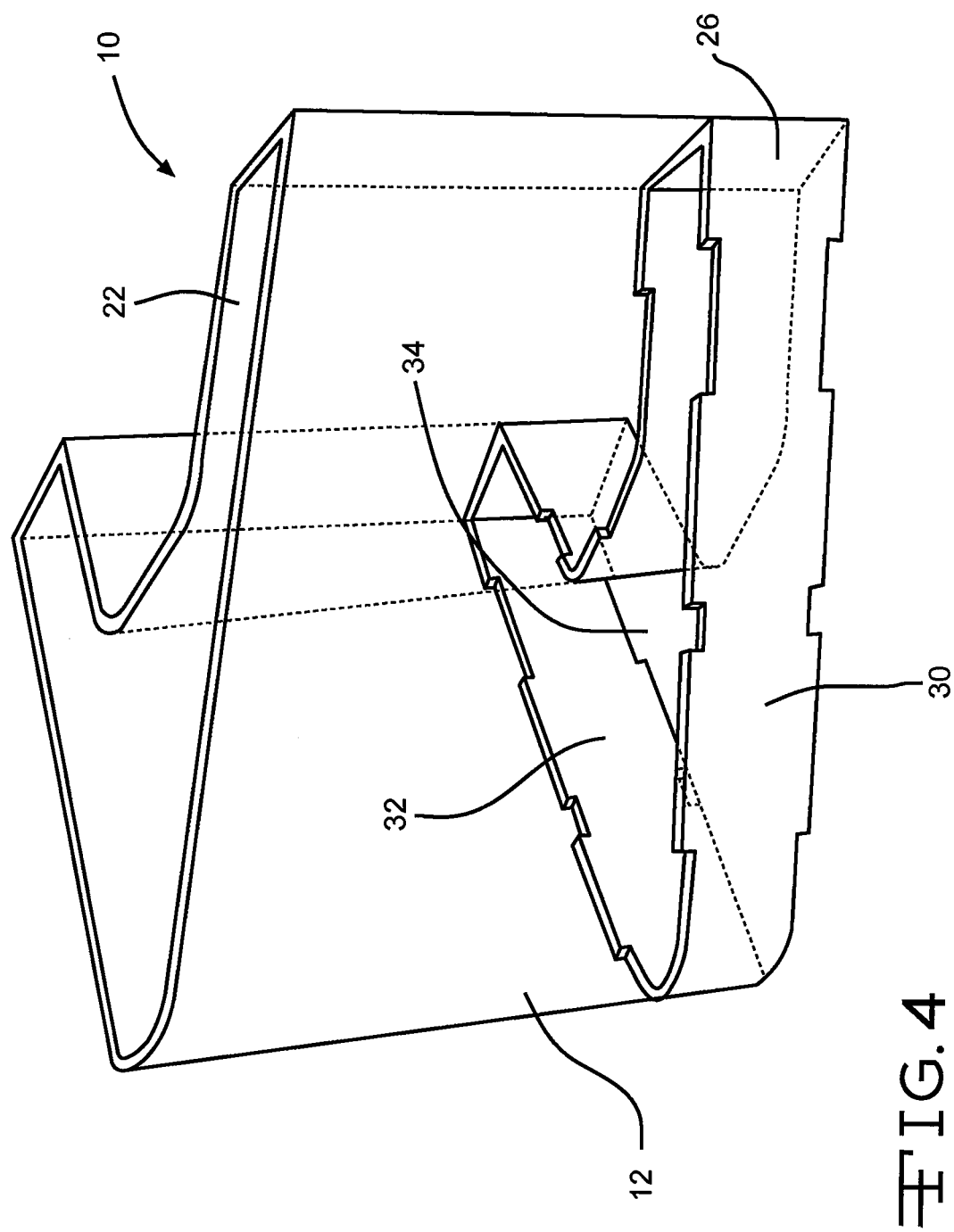
FIG. 4 shows a top-side perspective view of the thermal protection device of FIG. 3 with the shell's surfaces shown as being transparent, and all of the inner components disposed within the shell removed with the exception of a bottom porous wick structure.

FIG. 4 shows a top-side perspective view of the thermal protection device 10 of FIG. 3 with the surfaces of the shell 12 shown as being transparent, and all of the porous wick structures 26 and porous wick lid members 27 being removed from the shell 12 with the exception of a bottom porous wick structure 26. As shown in FIG. 4, each porous wick structure 26 may comprise an outer wick surface 30 which is disposed at least one of against and near the inner shell surface 22, and a porous wick inner surface 32 defining a hollow inner wick chamber 34. The outer wick surface 30 may be porous, or in other embodiments, non-porous.

Figure 5:
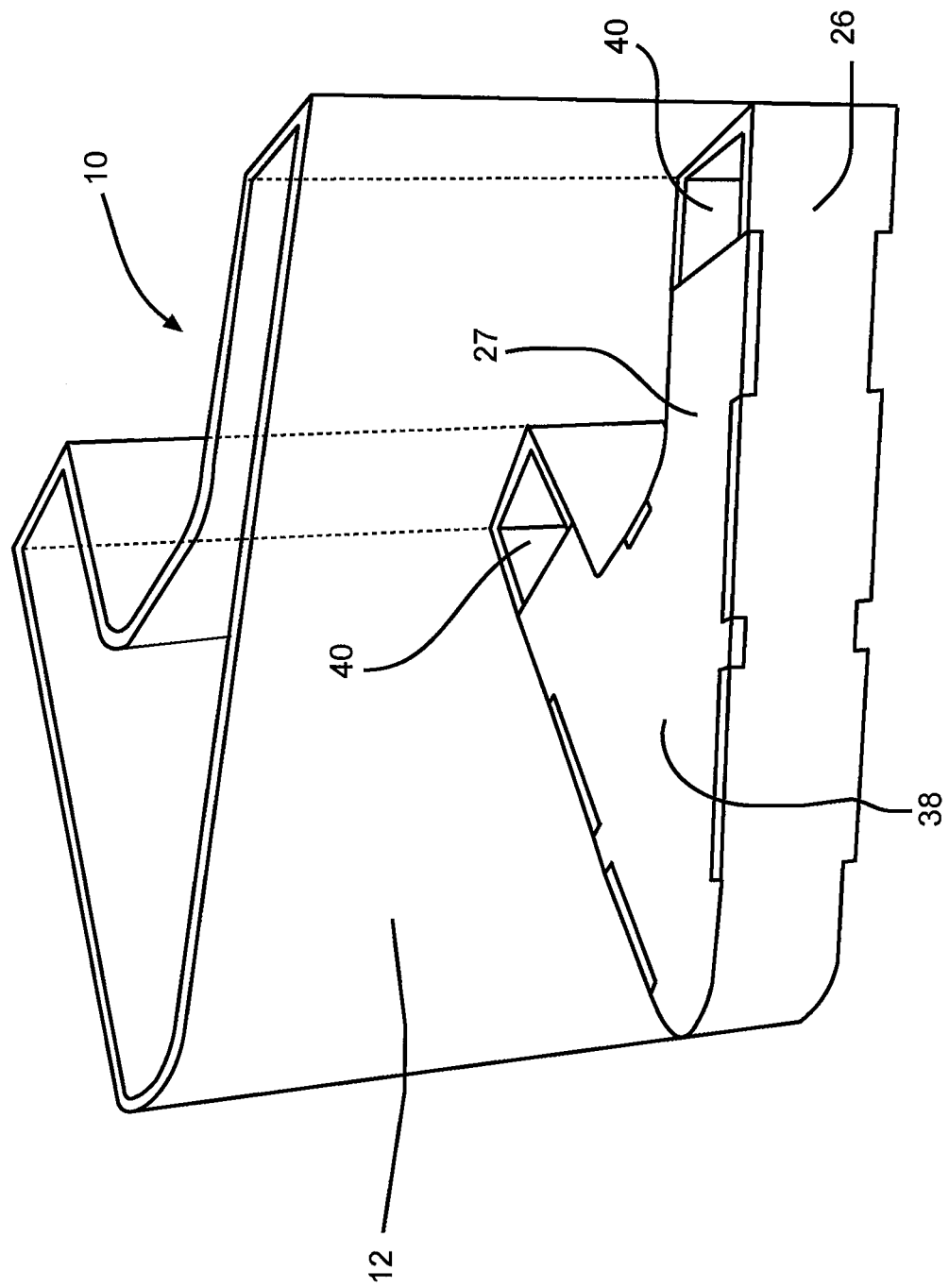
FIG. 5 shows a top-side perspective view of the thermal protection device of FIG. 3 with the shell's surfaces shown as being transparent, and all of the inner components disposed within the shell removed with the exception of a bottom porous wick structure, and a porous wick lid member.

FIG. 5 shows a top-side perspective view of the thermal protection device 10 of FIG. 3 with the surfaces of the shell 12 shown as being transparent, and all of the porous wick structures 26 and porous wick lid members 27 being removed from the shell 12 with the exception of the bottom porous wick structure 26, and porous wick lid member 27. As shown in FIG. 5, each porous wick lid member 27 may comprise a planar member 38 which may form an opening 40 disposed between the porous wick structures 26.

Figure 6:
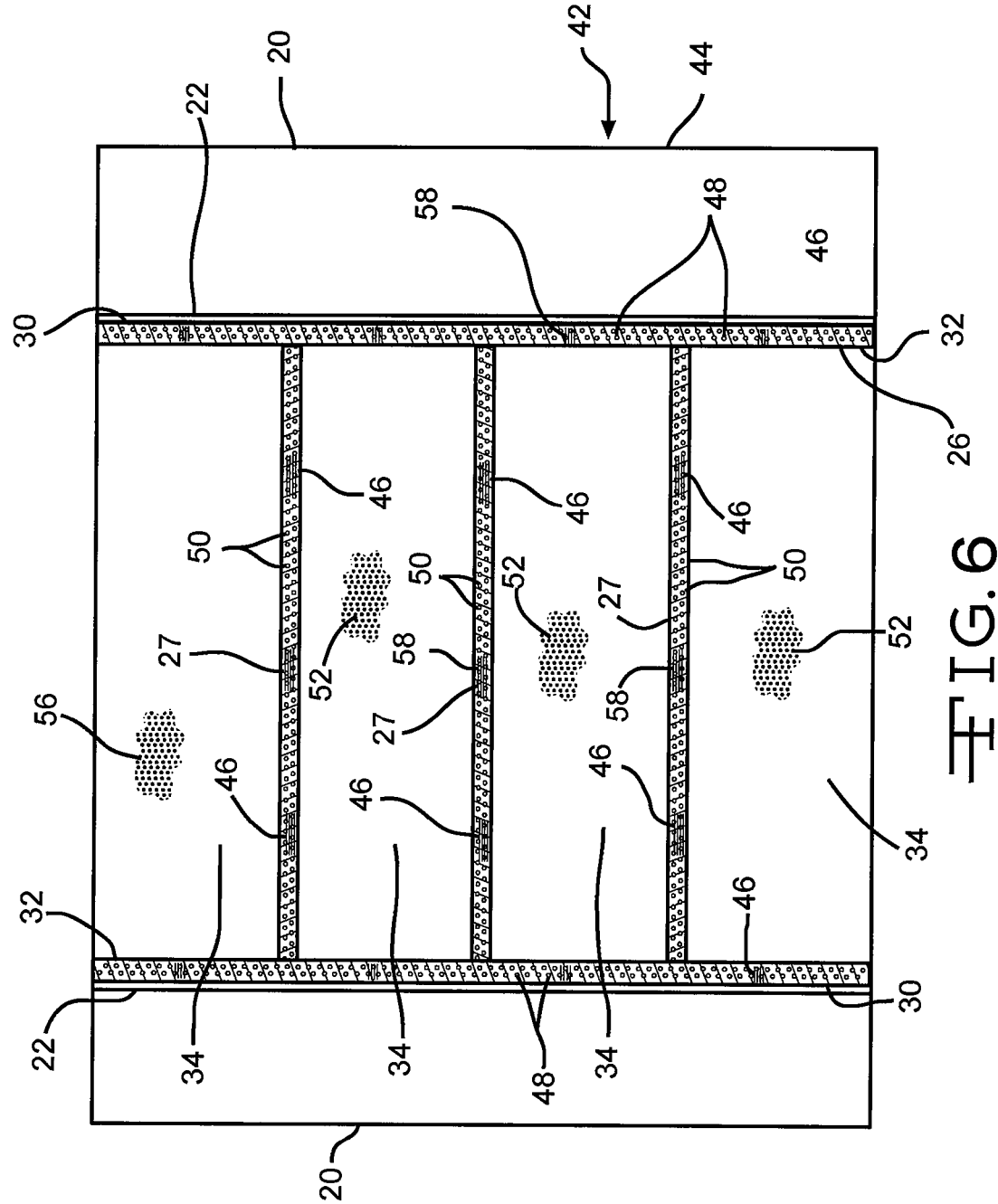
FIG. 6 shows a cross-section view along line 6-6 in the thermal protection device of FIG. 1.
Figure 7:
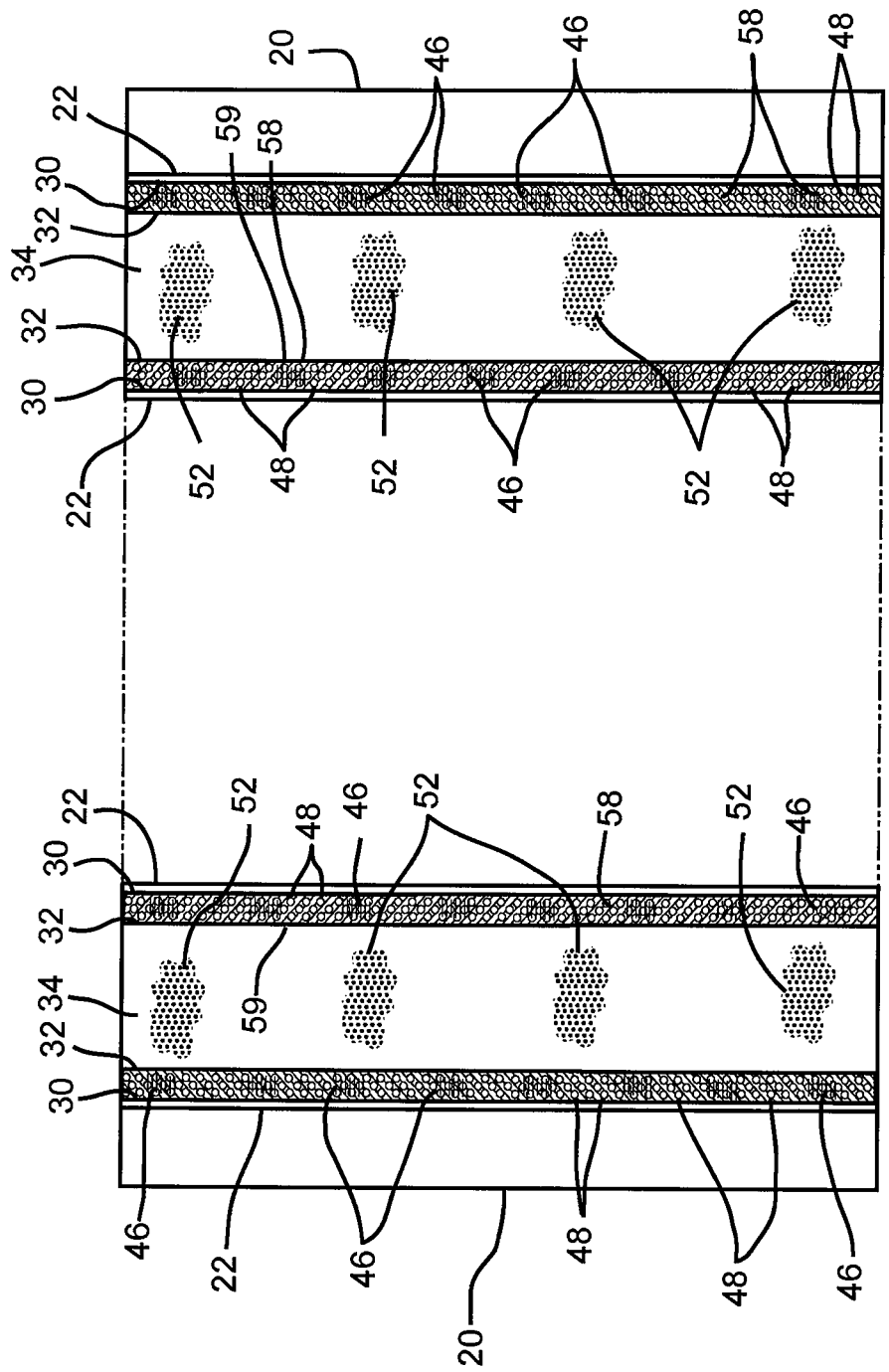
FIG. 7 shows a cross-section view along line 7-7 in the thermal protection device of FIG. 1.

FIG. 6 shows a cross-section view along line 6-6 in the thermal protection device 10 of FIG. 1. In other embodiments, additional porous wick lid members 27 may be stacked against the bottom surface 14 of the shell 12 and the plate member 19 covering the shell 12. FIG. 7 shows a cross-section view along line 7-7 in the thermal protection device 10 of FIG. 1. As shown in FIGS. 6 and 7, heat 42 may be generated against a portion 44 of the outer shell surface 20. For instance, if the thermal protection device 10 is used as a leading edge surface of an aircraft vehicle, flight may cause heat to be generated against any portion of the outer shell surface 20. The heat 42 may be passed through the outer shell surface 20, through the inner shell surface 22, and into the outer wick surface 30. The heat 42 may heat up cooling substance 46, which may comprise a cooling fluid, which may be disposed within the pores 48 of the porous wick structure 26 between the outer wick surface 30 and the porous inner wick surface 32. The cooling substance 46 being heated up may also be disposed within the pores 50 of the porous wick lid members 27. The heated up cooling substance 46 may be adapted to flow between the pores 48 and 50 of the stacked together porous wick structures 26 and porous wick lid members 27. The cooling substance 46 may not be disposed in, and may not flow in, the hollow inner wick chambers 34 of the porous wick structures 26. The cooling substance 46 may be heated to a point where it evaporates into a gas 52.

The gas 52 may pass through one or more of the pores 48 and 50 of the stacked together porous wick structures 26 and porous wick lid members 27 into one or more of the hollow inner wick chambers 34 of the porous wick structures 26. The gas 52 may flow between adjacent hollow inner wick chambers 34 of adjacent porous wick structures 26 by passing through the openings 40 disposed between the porous wick lid members 27 and the porous wick structures 26. As shown in FIG. 1, a cooling structure 54 may be disposed at least one of against, near, and adjacent a portion 56 of the outer shell surface 20. The cooling structure 54 may comprise a cooling pipe having cooling fluid running within it, or other type of cooling structure.

The gas 52 may condense into a condensed fluid 58 upon reaching an area 59 located near the cooling structure 54 shown in FIG. 1, thereby dissipating the heat 42 of the heated portion 44 through the cooling structure 54. Capillary action may then re-circulate the condensed fluid 58 through one or more of the pores 48 and 50 of the porous wick structures 26 and porous wick lid members 27, back to the heated portion 44 of the outer shell surface 20. The process may then repeat itself to continually dissipate the heat 42 of the heated portion 44 through the cooling structure 54.

Figure 8:
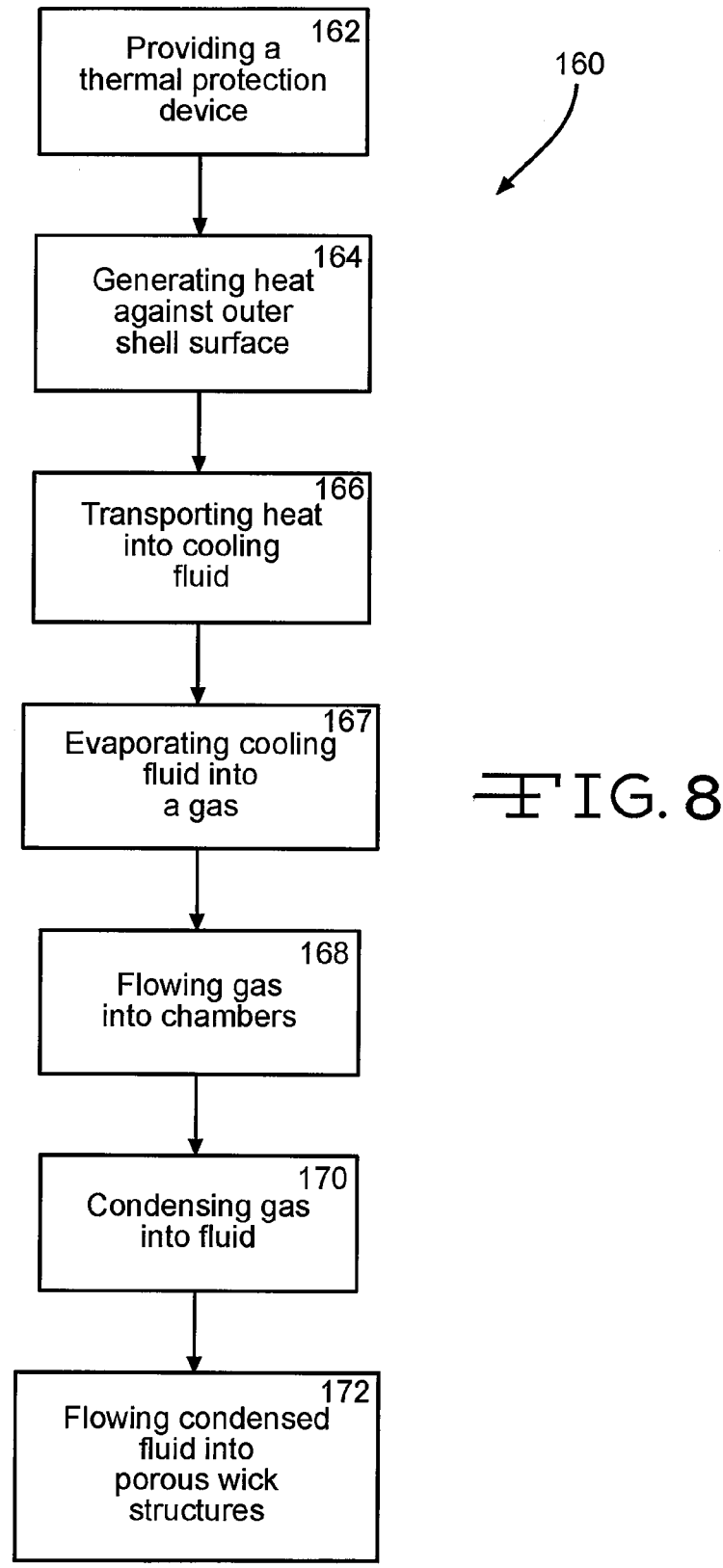
FIG. 8 is a flowchart showing one embodiment of a method of dissipating heat.

FIG. 8 is a flowchart showing one embodiment 160 of a method of dissipating heat 42. The method may be used to dissipate heat 42 from a leading edge of an aircraft vehicle, or from another type of vehicle, device, or structure. In one step 162, a closed thermal protection device 10 may be provided. The thermal protection device 10 may comprise any of the embodiments disclosed herein. In another step 164, heat 42 may be generated against a portion 44 of the outer shell surface 20, due to the heat 42 of flight incurred by the leading edge of an aircraft. In other embodiments, the heat 42 may be generated by other means. In another step 166, the heat 42 may be transported through the shell 12, through the plurality of porous wick structures 26, and into the cooling substance 46. The cooling substance 46 may be disposed between the outer wick surface 30 and the porous inner wick surface 32 of each porous wick structure 26. In other embodiments, the cooling substance 46 may be located as disclosed in any of the embodiments herein.

In yet another step 167, some of the cooling substance 46 may be evaporated into a gas 52 due to the heat 42. In still another step 168, the gas 52 may be flowed through the porous wick structures 26 and into the hollow inner wick chambers 34. The gas 52 may be flowed between adjacent hollow inner wick chambers 34 of adjacent porous wick structures 26 by passing through the openings 40 disposed between the porous wick lid members 27 and the porous wick structures 26. In an additional step 170, the gas 52 within the hollow inner wick chambers 34 may be condensed into a condensed fluid 58 due to a portion 56 of the outer shell surface 20 being disposed at least one of near, and against a cooling structure 54. The cooling structure 54 may comprise a cooling pipe having a cooling fluid disposed within it, or other type of cooling device. In yet another step 172, the condensed fluid 58 may be flowed into the porous wick structures 26 to repeat the process.

Figure 9:
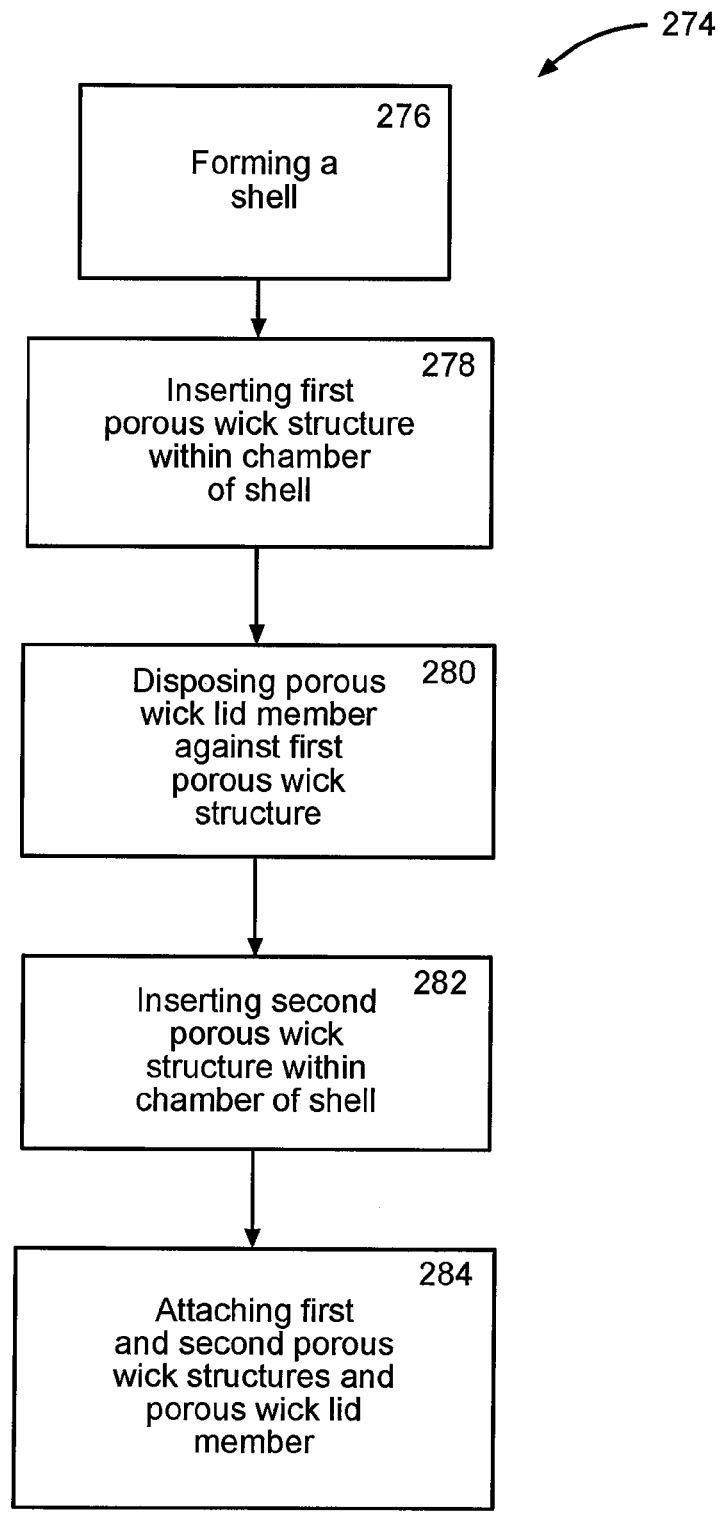
FIG. 9 is a flowchart showing one embodiment of a method of manufacturing a thermal protection device for dissipating heat.

FIG. 9 is a flowchart showing one embodiment 274 of a method of manufacturing a thermal protection device 10 for dissipating heat 42. The method may be used to manufacture a thermal protection device 10 for a leading edge of an aircraft vehicle, or other type of vehicle, device, or structure. In one step 276, a shell 12 may be formed comprising an outer shell surface 20 and an inner shell surface 22 defining a hollow inner shell chamber 24. The shell 12 may comprise any of the embodiments disclosed herein. In another step 278, a first porous wick structure 26 may be inserted within the hollow inner shell chamber 24 of the shell 12 against the bottom surface 14 of the shell 12. The first porous wick structure 26 may comprise any of the embodiments disclosed herein, including a first outer wick surface 30 and a first porous inner wick surface 32 defining a first hollow inner wick chamber 34. In other embodiments, a porous wick lid member 27 may be disposed against the bottom surface 14 of the shell 12 prior to inserting the first porous wick structure 26. In yet another step 280, a first side of a porous wick lid member 27 may be disposed against the first porous wick structure 26 within the hollow inner shell chamber 24 of the shell 12. In such manner, one side of the first hollow inner wick chamber 34 may be substantially covered. The porous wick lid members 27 may comprise any of the embodiments disclosed herein.

In an additional step 282, a second porous wick structure 26, which may be different than the first porous wick structure 26, may be inserted and disposed against a second side of the porous wick lid member 27 within the hollow inner shell chamber 24 of the shell 12. The second porous wick structure 26 may comprise any of the embodiments disclosed herein, including a second outer wick surface 30 and a second porous inner wick surface 32 defining a second hollow inner wick chamber 34. In still another step 284, the first porous wick structure 26, the porous wick lid member 27, and the second porous wick structure 26 may be fixedly attached to each other within the hollow inner shell chamber 24 of the shell 12. This may be done through welding, through interlocking male and female members, or through other attachment mechanisms. In the same step, the planar member 38 of each porous wick lid member 27 may be attached to the inner shell surface 22 through welding, or other attachment mechanisms.

In further steps, additional porous wick structures 26 and additional porous wick lid members 27 may be inserted and disposed against each other within the hollow inner shell chamber 24 of the shell 12. In yet another step, the thermal protection device 10 may be closed using a plate member 20. In still another step, a cooling substance 46 may be disposed within the first and second porous wick structures 26. In an additional step, a portion of the outer shell surface 20 may be disposed at least one of against and near a cooling structure 54 comprising any of the embodiments disclosed herein. In still another step, multiple thermal protection devices 10 may be stacked and attached together in order to form a modular device.

One or more embodiments of the thermal protection devices 10 disclosed herein may allow for a shell 12 made of a thin material which may have small dimensions and be of reduced weight. The porous wick structures 26 and the porous wick lid members 27 may allow for increased mechanical support and/or increased cooling substance 46. The welding and/or interlocking attachment of the porous wick structures 26 may allow for more efficient, more timely, and/or more economic manufacturing. In addition, the modular nature of the thermal protection devices 10, including the porous wick structures 26, may allow for easy replacement of parts, and/or less complex manufacturing. One or more of the disclosed embodiments may also reduce one or more other problems of one or more of the other existing devices.

It should be understood, of course, that the foregoing relates to exemplary embodiments of the disclosure and that modifications may be made without departing from the spirit and scope of the disclosure as set forth in the following claims.

The invention claimed is:

1. A method of manufacturing a thermal protection device comprising:
   inserting a first porous, fluid and gas permeable wick structure, having a first hollow chamber fluid and gas permeably connected to and disposed within the first porous, fluid and gas permeable wick structure, within a shell; and
   inserting a second porous, fluid and gas permeable wick structure, having a second hollow chamber fluid and gas permeably connected to and disposed within the second porous, fluid and gas permeable wick structure, within the shell so that each of the first and second porous, fluid and gas permeable wick structures and the first and second hollow chambers are fluid and gas permeably connected, and
   disposing a porous, fluid and gas permeable wick lid member within the shell between the first, porous, fluid and gas permeable wick structure and the second, porous, fluid and gas permeable wick structure, such that an opening is disposed between the first hollow chamber and the second hollow chamber.

2. The method of claim 1 further comprising using the manufactured thermal protection device as a leading edge of an aircraft to dissipate heat.

3. The method of claim 1 further comprising disposing the first porous, fluid and gas permeable wick lid member within the shell against both the first, porous, fluid and gas permeable wick structure and the second, porous, fluid and gas permeable wick structure.

4. The method of claim 1 further comprising disposing the first porous, fluid and gas permeable wick lid member over the first hollow chamber within the shell.

5. The method of claim 4 further comprising disposing the first porous, fluid and gas permeable wick lid member between the first hollow chamber and the second hollow chamber within the shell.

6. The method of claim 1 further comprising closing the shell to close the thermal protection device.

7. The method of claim 1 further comprising disposing a cooling substance within the first and second porous, fluid and gas permeable wick structures.

8. The method of claim 7 wherein the cooling substance comprises a fluid.

9. The method of claim 8 further comprising evaporating the fluid within the first and second porous, fluid and gas permeable wick structures to a gas.

10. The method of claim 9 further comprising flowing the gas from the first and second porous, fluid and gas permeable wick structures into the first and second hollow chambers.

11. The method of claim 10 further comprising condensing the gas in the first and second hollow chambers back to the fluid.

12. The method of claim 11 further comprising flowing the fluid from the first and second hollow chambers back into the first and second porous, fluid and gas permeable wick structures.

13. The method of claim 1 further comprising attaching the first and second porous, fluid and gas permeable wick structures to one another within the shell.

14. The method of claim 1 further comprising disposing a portion of an outer portion of the shell against a cooling structure.

15. The method of claim 1 wherein the first, porous, fluid and gas permeable wick structure comprises a first outer, porous, fluid and gas permeable wick surface and a first inner, porous, fluid and gas permeable wick surface, and the first hollow chamber is disposed inside of both the first outer, porous, fluid and gas permeable wick surface and the first inner, porous, fluid and gas permeable wick surface.

16. The method of claim 15 wherein the second, porous, fluid and gas permeable wick structure comprises a second outer, porous, fluid and gas permeable wick surface and a second inner, porous, fluid and gas permeable wick surface, and the second hollow chamber is disposed inside of both the second outer, porous, fluid and gas permeable wick surface and the second inner, porous, fluid and gas permeable wick surface.

17. A method of manufacturing a thermal protection device comprising:
    inserting a first porous, fluid and gas permeable wick structure, comprising a first outer, porous, fluid and gas permeable wick surface, a first inner, porous, fluid and gas permeable wick surface, and a first hollow chamber fluid and gas permeably connected to and disposed inside of both the first outer, porous, fluid and gas permeable wick surface and the first inner, porous, fluid and gas permeable wick surface, within a shell;
    inserting a first porous, fluid and gas permeable wick lid member within the shell over the first porous, fluid and gas permeable wick structure; and
    inserting a second porous, fluid and gas permeable wick structure, comprising a second outer, porous, fluid and gas permeable wick surface, a second inner, porous, fluid and gas permeable wick surface, and a second hollow chamber fluid and gas permeably connected to and disposed inside of both the second outer, porous, fluid and gas permeable wick surface and the second inner, porous, fluid and gas permeable wick surface, within the shell over the first porous, fluid and gas permeable wick lid member such that each of the first and second porous, fluid and gas permeable wick structures and the first and second hollow chambers are fluid and gas permeably connected and such that an opening is disposed between the first hollow chamber and the second hollow chamber.

18. The method of claim 17 further comprising disposing a cooling substance between within the first outer, porous, fluid and gas permeable wick surface and the first inner, porous, fluid and gas permeable wick surface.

19. The method of claim 18 further comprising evaporating the cooling substance to a gas between the first outer, porous, fluid and gas permeable wick surface and the first inner, porous, fluid and gas permeable wick surface, flowing the gas from the first porous, fluid and gas permeable wick structure into the first hollow chamber, condensing the gas into a condensed substance within the first hollow chamber, and flowing the condensed substance from the first hollow chamber back between the first outer, porous, fluid and gas permeable wick surface and the first inner, porous, fluid and gas permeable wick surface.

* * * * *